Aug. 14, 1951     M. F. DE GRAVE     2,563,992
SWIVEL VALVE HEAD ASSEMBLY
Filed Dec. 21, 1945
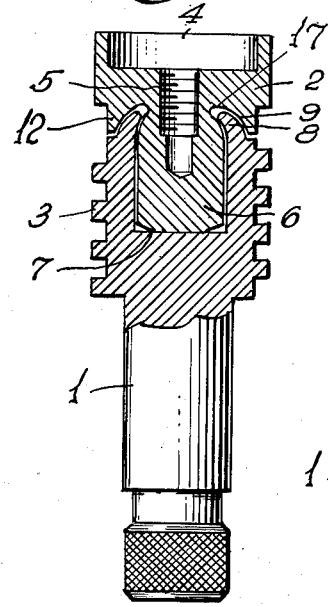
Fig. 1
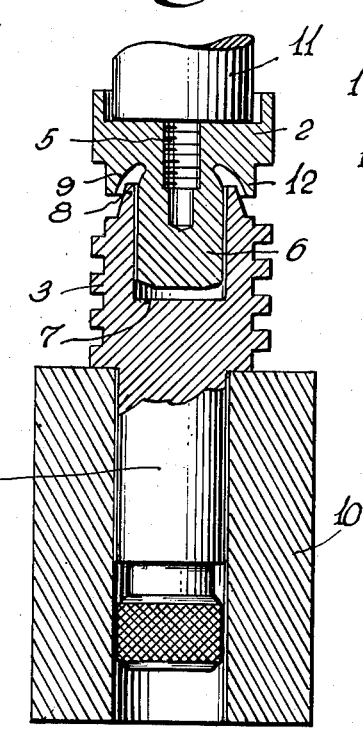
Fig. 2
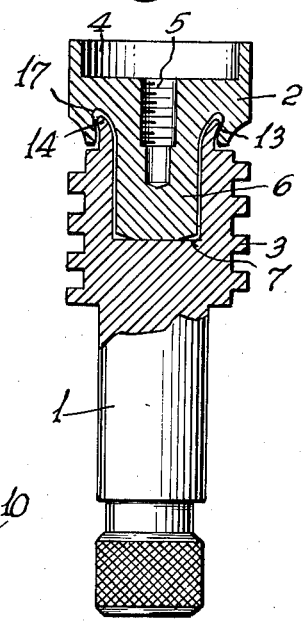
Fig. 3
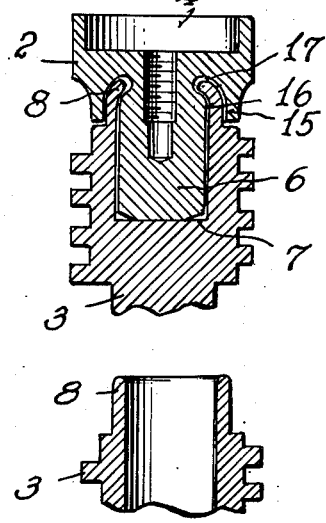
Fig. 4
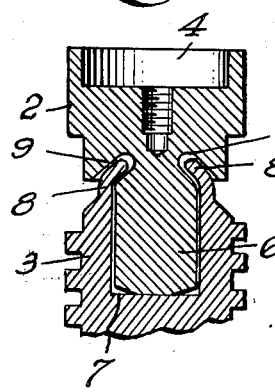
Fig. 6
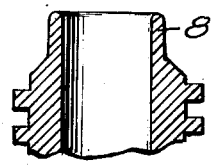
Fig. 7
Fig. 5
Inventor
Marvin F. De Grave,
Attorney Patented Aug. 14, 1951

2,563,992

UNITED STATES PATENT OFFICE 2,563,992

SWIVEL VALVE HEAD ASSEMBLY

Marvin F. De Grave, Salem, Ohio, assignor to Eljer Company, Ford City, Pa.

Application December 21, 1945, Serial No. 636,432

3 Claims. (Cl. 251—46)

This invention relates to valve stems for plumbing faucets, and has for its object to provide for rotatably mounting a valve member on the stem in a new and improved manner such that a freely rotatable swivel connection may be assured by the particular arrangement and assembling of the parts.

It is a further object of the invention to have the swivel connection made up of parts integral with the rotatably connected valve stem members, and to provide for interconnecting said parts in a simple and effective manner so that the stem members may be connected against separation and at the same time be free for relative rotation whereby the valve may remain stationary against its seat while the shank portion of the stem is being turned or rotated to set and tighten the valve against its seat.

Another object of the invention is to provide for sealing the swivel joint against corrosive action of water or other liquid controlled by the valve.

With these and other objects in view, the present invention consists in the combination and arrangement of parts, as will be hereinafter more fully described, illustrated in the accompanying drawing and particularly pointed out in the appended claims and it will, of course, be understood that changes in the form, proportion and minor details may be made, within the scope of the appended claims, without departing from the principles of the present invention.

In the drawing—

Figure 1 is a longitudinal sectional view of a valve stem for plumbing faucets embodying the features of the present invention.

Figure 2 is a similar view showing the manner of assembling and connecting the parts of the valve stem.

Figure 3 is a view similar to Figure 1 showing a modification in the form of the swivel connection between the valve carrying head and the shank of the valve stem.

Figure 4 is a fragmentary sectional view illustrating a slight change in the form of the groove and the tongue constituting the swivel connection.

Figure 5 is a detail fragmentary sectional view illustrating the shape of the tongue before it is assembled with the groove.

Figure 6 is a fragmentary sectional view illustrating another specific form of tongue and groove connection.

Figure 7 is a fragmentary sectional view illustrating the shape of the tongue before it is assembled with the groove as shown in Figure 6.

The valve stem of the present invention is made up of a shank 1 and a valve-disc carrying head 2, there being a swivel connection between these parts. The shank 1 may be screw threaded, as at 3, for cooperation with the common or usual operating means, or it may be otherwise, to cooperate with any other form of stem operating means.

Any suitable provision may be made for connecting a valve disc to the carrying head such, for instance, as a socket 4 in the outer end of the carrying head forming a seat for the valve member and a screw threaded bore 5 extending inwardly from the closed end of the socket to receive a screw threaded fastening extending through the valve member in the usual or common manner. Other ways of fastening a valve disc to the valve carrying head may be employed.

The inner end of the head, i. e., the one next to the shank 1, is provided with a stem 6 extending centrally therefrom and occupying a seat or socket 7 formed in the adjacent end of the shank 1 and disposed concentrically thereon. The stem 6 and the socket are circular in cross section and the stem has a working fit in the socket so that it may rotate therein and contribute to the swivel connection between the head 2 and shank 1. Furthermore, it is to be noted that the stem 6 is of a length slightly greater than the depth of the seat or socket 7, which is a very important feature in the proper assembling and during operation of the device, to be hereinafter more fully explained.

To prevent separation of the shank and head and at the same time permit relative rotation of these parts on the longitudinal axis of the shank as a center, and thus provide a swivel connection between the parts, a circular interlocking tongue and groove connection is provided between the parts 1 and 2. One form of such a connection is shown in Figures 1 and 2, wherein 8, in Figure 2, is a tongue in the form of a circular flange projecting outward from the inner end of the shank 1 and disposed concentrically with respect to the seat or socket 7 in the shank. The inner face of this flange or tongue forms a continuation of the inner walls of the socket 7. In Figures 1 and 2, the inner end of the head 2 is provided with a circular groove 9 concentric with the stem 6 of a diameter to receive the outer end of the flange when the parts are being assembled as in Figure 2. The groove, in this illustrated embodiment of the invention, flares or tapers inwardly, so that its opposite walls provide a dome-shaped configuration surrounding the end of the stem 6 at its connection with the head 2.

In assembling the shank 1 and head 2, the shank 1 is placed in the seat or socket of the jig or holder 10 of a suitable press. The stem 6 of the head is thrust into the socket 7 of the shank, and then the plunger 11 of the press is brought against the outer end of the head. Upon applying pressure to the plunger, the head will be forced towards the shank 1 until the end of the stem 6 engages the bottom of the socket 7 and the circular flange or tongue 8 will be forced into the groove 9, whereby the tongue will conform to the shape of the groove and will be crimped around the crowned portion of the adjacent end of the stem 6 into the condition shown in Figure 1. The pressure applied by the press is sufficient to cause the circular tongue 8 to conform to the shape of the groove without being jammed or tightly fitted therein by reason of the engagement of the end of the stem 6 with the bottom of the socket 7 and the size and shape of the groove and tongue are such as to permit relative turning of either member on the other so as to provide a swivel connection between the head 2 and shank 1. The dome shape of the circular flange or tongue 8 after it has been crimped upon the dome shaped end of the stem 6 interlocks the shank and head and prevents separation of the head 2 and shank 1. Thus, a simple, effective, durable and inexpensive swivel connection between the head and shank is provided without the use of an additional fastening member and the parts may be assembled in a press and then connected together merely by the operation of the press in a very simple, effective and inexpensive manner.

In the assembling of the parts in a press, it will be noted that an end of the screw threaded part 3 of the shank constitutes a shoulder or abutment to rest against the jig or holder of the press and support the shank against the pressure of the plunger of the press. The unthreaded part of the shank occupies the seat or opening in the jig and holds the entire valve stem in alinement with the plunger and thereby insures an effective crimping of the circular tongue in the groove and about the dome shaped end of the stem 6.

It will be noted that the groove 9 provides a skirt or flange portion 12 on the inner end of the head 2. This skirt exteriorily surrounds the flange 8 and provides an overlapped joint between the head and shank which effectively excludes water or other liquid from access to the interior portion of the swivel joint or connection and thus prevents corrosion of the parts which connect the head and shank and insures a smooth and easy turning of one member upon the other. The stem 6 having a rotatable working fit in the terminal seat 7 in the shank of the valve stem braces the swivel joint and relieves the swivel of lateral and axial strains not only during the assembly of the parts but during operation of the valve.

A slight modification of the present invention has been shown in Figure 3 wherein the groove 13 flares outwardly which causes the circular tongue 14 to flare outwardly in conformity with the groove under the action of the press in which the parts are assembled and subjected to pressure in the same manner as shown and described for Figures 1 and 2. In this latter form of the device, the outer peripheral portion of the tongue overhangs the inner end portion of the skirt 12 to prevent separation of the head 2 and shank 1, in the manner of the arrangement shown in Figures 1 and 2.

A slight change in the shape of the tongue and groove swivel connection has been shown in Figure 4, wherein the parts are the same as in Figures 1, 2 and 3, the only difference being that the entrance portion of the groove is circular in shape so that its opposite walls 15 and 16 are parallel. Its inner portion is flared inwardly, as shown in Figure 4, or outwardly, if desired, as shown in Figure 3. Prior to assembling the tongue and groove, the shape of the tongue is as shown in Figure 5 from which it will be seen that the tongue is circular in shape with its inner and outer walls parallel. When being assembled with the groove, the outer end portion of the tongue conforms to the flared shape of the groove and provides for interlocking the parts against endwise separation.

In Figure 6 a further slight change is shown in the tongue and groove connection. In this figure it will be seen that the groove 9, instead of being dome shaped, is inclined inwardly and its opposite side walls are straight and parallel. Before assembly with the groove, as shown in Figure 7, the tongue 8 is circular or cylindrical in shape with its opposite side walls straight and parallel, and during the operation of assembly, the outer end portion of the tongue 8 will conform to the groove 9 in such a manner as to prevent endwise separation of the parts. While the groove 9 has been shown as flared or inclined inwardly in Figure 6, it is contemplated that it may also be inclined outwardly as shown in Figure 3.

In each form of the invention, there should be a space 17 between the closed end of the groove and the adjacent end of the tongue in the assembled position of these parts, so as to prevent a frictional engagement of these parts which might interfere with the free turning of the head 2 upon the shank 1. In addition, the seating of the lower end of the stem 6 on the bottom of the receptacle or socket 7 will provide a thrust bearing for the interlocking rotatable joint and relieve these parts of wear and pressure strain during the operation and use of the valve stem when assembled in a valve structure.

In each form of the invention as illustrated in the accompanying drawing, it will be noted that the interfitting parts forming the swivel joint or connection are integral with the respective connected members and form the sole connection thereby avoiding the use of any additional or separate fastening means. The swivel connection is in effect seated within and protected by the connected parts against the corrosive effects of the fluid controlled by the valve. The valve stem parts including the joint members are so constructed and arranged as to facilitate assembly and completion of the swivel joint by use of a press, and to prevent misalinement of the parts during the operation of the press, thus insuring a proper and effective bending or crimping of the circular tongue to fit the groove and provide the desired swivel joint.

What I claim is:

1. A swivel head valve, comprising a valve stem provided with an elongated cylindrical bore, a relatively thin annular wall surrounding the bore entrance, a valve head having an elongated cylindrical boss adapted to snugly fit into said bore and bear against the bottom of the bore when in assembled relation providing a thrust bearing, said elongated boss having a reduced diameter at its junction with the head, forming an annular groove and means in combination with end pressure for interlocking said thin annular wall and annular groove in freely rotatable relation, said thrust bearing being in a plane remote from the plane at the interlocking connection between the annular wall and annular groove.

2. A swivel head valve, comprising a valve stem provided with an elongated cylindrical bore, a relatively thin annular wall surrounding the bore entrance, a valve head having an elongated cylindrical boss adapted to snugly fit into said bore and bear against the bottom of the bore when in assembled relation providing a thrust bearing, said elongated boss having a reduced diameter at its junction with the head, forming an annular groove and means in combination with end pressure for interlocking said thin annular wall and annular groove in freely rotatable relation, the elongated boss and bore providing accurate alignment of the head with the stem to prevent lateral movement of said head and also limit the endwise movement of the parts under end pressure during assembly and use, said thrust bearing being in a plane remote from the plane at the interlocking connection between the annular wall and annular groove.

3. A swivel head valve, comprising a valve stem provided with an elongated cylindrical bore, a relatively thin annular wall surrounding the bore entrance, a valve head having an elongated cylindrical boss adapted to snugly fit into said bore and bear against the bottom of the bore when in assembled relation providing a thrust bearing the area of contact between the bottom of the bore and the boss being less than the cross sectional area of the boss, said elongated boss having a reduced diameter at its junction with the head, forming an annular groove and means in combination with end pressure for interlocking said thin annular wall and annular groove in freely rotatable relation, the elongated boss and bore providing accurate alignment of the head with the stem to prevent lateral movement of said head and limit the endwise movement of the parts under end pressure during assembly and use, said thrust bearing being in a plane remote from the plane at the interlocking connection between the annular wall and annular groove, whereby said remote thrust bearing and elongated bore and boss will relieve the rotatable interlocking connection from all lateral and endwise stresses during the operation of the valve.

MARVIN F. DE GRAVE.

REFERENCES CITED

The following references are of record in the file of this patent:

UNITED STATES PATENTS

| Number | Name | Date |
| --- | --- | --- |
| 218,936 | Cooper | Aug. 26, 1879 |
| 638,564 | Davies | Dec. 5, 1899 |
| 1,033,149 | Bray | July 23, 1912 |
| 1,186,829 | Pohlman | Jan. 13, 1916 |